United States Patent [19]

Jackson, Jr. et al.

[11] 3,907,733

[45] Sept. 23, 1975

[54] HOT MELT ADHESIVE COMPOSITIONS

[75] Inventors: Winston J. Jackson, Jr., Kingsport, Tenn.; William R. Darnell, Weber City, Va.

[73] Assignee: Eastman Kodak Company, Rochester, N.Y.

[22] Filed: Jan. 8, 1974

[21] Appl. No.: 431,650

[52] U.S. Cl...... 260/22 D; 117/122 PA; 117/161 P; 117/161 UZ; 156/331; 156/332; 161/214; 260/23 P
[51] Int. Cl.[2]...................... B32B 15/08; C09J 3/14
[58] Field of Search ............ 260/22 D; 117/122 PA; 156/331, 332; 161/214

[56] References Cited
UNITED STATES PATENTS

| | | | |
|---|---|---|---|
| 3,650,999 | 3/1972 | Martins et al..................... | 260/22 D |
| 3,657,389 | 4/1972 | Caldwell et al..................... | 260/873 |
| 3,795,644 | 3/1974 | Jackson et al.................... | 260/22 D |

*Primary Examiner*—Ronald W. Griffin
*Attorney, Agent, or Firm*—J. Frederick Thomsen; Daniel B. Reece, III

[57] ABSTRACT

Hot melt adhesive compositions having improved bond aging characteristics are disclosed. The compositions include blends of (a) certain block poly(esteramides) having about 5 to about 55 weight percent of amorphous polyamide segments and about 95 to about 45 weight percent of crystalline polyester segments with (b) a vinyl aromatic polymer.

18 Claims, No Drawings

HOT MELT ADHESIVE COMPOSITIONS

This invention relates generally to hot melt adhesives, and more specifically, this invention relates to hot melt adhesive compositions having improved bond aging characteristics as well as other important properties.

Hot melt adhesives are of importance because of their speed of application compared with other types of adhesives. No solvents must evaporate, no curing must take place, and strong adhesive bonds are obtained as soon as the adhesive cools. Polyesters and poly(esteramides) have been found useful as hot melt adhesives. Many polyesters have low adhesive strength, particularly peel strength, on various uncoated substrates such as aluminum, copper, steel, glass, etc., and on substrates coated with various materials, such as polyepoxide resins, vinyls, phenolics, alkyds, acrylics, etc. Another problem often encountered is that some hot melt adhesives lack the ability to maintain high adhesive strength after aging as well as the ability to maintain high bond strength under relatively high temperature conditions. Moreover, many hot melt adhesives, particularly crystalline high melting polyesters, have high melt viscosities, resulting in inferior flow and wetting properties and, therefore, must be applied at relatively high temperatures when used as hot melt adhesives.

In U.S. Pat. No. 3,657,389, hot melt adhesive blends of poly(tetramethylene terephthalate) and polystyrene are disclosed. The adhesion to certain metals of the polyester of particular inherent viscosity (I.V.) is increased by the addition of polystyrene. A similar I.V. poly(tetramethylene terephthalate) modified with 15–20 mole percent dimer acid has low adhesion on metals, but a dramatic increase in adhesion, especially to uncoated steel, occurs when this dimer acid-modified polyester is blended with polystyrene.

Our copending application Ser. No. 280,930 filed Aug. 14, 1972 (now U.S. Pat. No. 3,795,644) is directed to dimer acid-modified poly(tetramethylene terephthalate) blended with vinyl aromatic polymers. This composition has a relatively low melt viscosity and improved adhesion to metals. Our copending Application Ser. No. 425,046 filed Dec. 14, 1973, which is a continuation-in-part of our aforesaid Ser. No. 280,930 is directed to dimer acidmodified polyesters derived from terephthalic acid and $C_2$–$C_{10}$ glycols blended with vinyl aromatic polymers. Furthermore, U.S. Pat. No. 3,650,999 discloses poly(ester-amide) block copolymer hot melt adhesives. We have now found that by blending certain poly(ester-amide) block copolymers with vinyl aromatic polymers, preferably polystyrene, the bond aging characteristics, particularly with respect to uncoated steel substrates, are very significantly improved.

It is, therefore, an object of this invention to provide hot melt adhesives having good adhesion to various types of substrates, especially metals.

A still further object is to provide hot melt adhesive compositions capable of maintaining high adhesive strength upon aging as well as the ability to maintain high bond strengths under relatively high temperature conditions.

A still further object is to provide laminated articles consisting of various substrates bonded with these compositions.

Another object of this invention is to provide hot melt adhesives derived from a blend of certain poly(ester-amides) and vinyl aromatic polymers.

Other objects are apparent elsewhere in this specification.

These objects have been obtained in accordance with the present invention by blending from about 5 to about 40 (preferably about 5 to about 25) percent by weight of a vinyl aromatic polymer with about 95 to about 60 (preferably about 95 to about 75) percent by weight of a poly(esteramide). The poly(ester-amide) may be prepared by reacting a crystalline polyester prepolymer and an amorphous polyamide prepolymer.

The poly(ester-amide) contains from about 45 to about 95 weight percent (preferably about 50 to about 80) of segments derived from a crystalline polyester and from about 5 to about 55 weight percent (preferably about 20 to about 50) weight percent of amorphous polyamide.

The polyester reactant is considered to be a prepolymer in view of the fact that it copolymerizes with the other reactants to form a block copolymer. The polyester must be capable of contributing a crystalline structure to the resulting poly(ester-amide) as is evidenced by a crystalline melting point as determined by differential thermal analysis (DTA) and/or differential scanning calorimetry (DSC) methods. Moreover, the polyester should have a melting point higher than 145°C. and preferably in the range of 200°C. to 300°C. and an inherent viscosity of at least 0.1 and preferably in the range of from 0.2 to 0.5 when measured at 25°C. using 0.50 gram of polymer per 100 ml. of a solvent consisting of 60 percent by weight phenol and 40% by weight tetrachloroethane.

The polyester preferably is derived from
A. a glycol component, at least about 80 mole percent of which is a glycol having from 2 to 10 carbon atoms. Other glycols, aliphatic or alicyclic, straight or branched chain, containing 11 to 40 carbon atoms may also be included in the glycol component in amounts not exceeding about 20 mole percent. Most desirably, substantially all of the glycol component is a glycol having from 2 to 6 carbon atoms; and
(B) an acid component of dicarboxylic acid containing from 2 to 20 carbon atoms, at least about 80 mole percent of which is terephthalic acid. Other dicarboxylic acids, aliphatic, aromatic or alicyclic, containing from 2 to 20 carbon atoms may also be included in this component in amounts not exceeding about 20 mole percent.

Although up to about 20 mole percent of the glycols and dicarboxylic acids other than glycols containing from 2 to 10 carbon atoms and terephthalic acid, may be used in the copolyester component of this invention if desired, it is preferred that the glycol and dicarboxylic acid portion be essentially a 2 to 10 carbon glycol and terephthalic acid. Other suitable glycols are alicyclic and aliphatic glycols containing from 11 to 40 carbon atoms. The carbon chain may be straight or banched. Examples of such glycols include ethylene glycol; 1,6-hexanediol; 1,10-decanediol; 2,2-dimethyl-1,3-propanediol; 1,4-cyclohexanedimethanol; 1,4-cyclohexanediol; diethylene glycol; triethylene glycol and dimer glycol. Other suitable dicarboxylic acids are straight and branched chain aliphatic, alicyclic and aromatic acids containing from 2 to 20 carbon atoms including maleic, dimethylmalonic, adipic, 2- methyladipic, azelaic, sebacic, isophthalic, hexahydroterephthalic, hexahydroisophthalic, trans-1,4-cyclohexanedicarboxylic, 2,5-norbornanedicarboxylic and oxydipropionic acid.

The amide portion of the poly(ester-amide) adhesive compositions of this invention are amorphous block segments which contribute wettability, elasticity and rubber character to the adhesive composition. The polyamide portion of the poly(ester-amide) compositions of the present invention is the reaction product of a dimer acid and an aliphatic primary diamine.

The term "dimer acid" as used herein refers to a 36 carbon atom, long chain aliphatic dicarboxylic acid. The preparation and structure of the dimer acids is described in Journal of American Oil Chemists Society, 39, 534–545 (1962). It is generally prepared by dimerizing an unsaturated fatty acid containing 18 carbon atoms such as linoleic or linolenic acid or a monohydric alcohol ester thereof. It is recognized in the art that dimer acids are chemicals of unique properties. Several different grades of dimer acids are available commercially which vary in monomer and trimer content and iodine value. For example, dimer acid is available from Emery Industries, Inc. Preferably, the dimer acid used in this invention is substantially free of monomer and trimer fractions, which can be accomplished by distillation. Preferably, the dimer acid content is at least 95 percent. The dimer acid may be used in its hydrogenated or unhydrogenated form.

The aliphatic primary diamines used in this invention contain from 2 to 10 carbon atoms. Examples include ethylene diamine, tetramethylene diamine, nonamethylene diamine, decamethylene diamine, 1,3-propane diamine, 1,5-pentane diamine, hexamethylene diamine, cyclohexylene diamine, etc. The preferred diamine is 1,6-hexane diamine.

Useful copolyamide segment variations may be obtained by modifying the preferred polyamide segment with up to 25 weight percent (based on total acid content) of other aliphatic dicarboxylic acids containing 6 to 20 carbon atoms. Examples of such acids include sebacic, suberic, adipic, azelaic, and pimelic acids.

The poly(ester-amide) compositions of the present invention are further characterized as having an inherent viscosity of at least 0.3 and more preferably from 0.4 to 0.7. The crystalline melting point of these materials, as measured by DTA or DSC, is in the range of from about 100°C. to 300°C.

The poly(ester-amide) is prepared by a one-step or two-step method. In the one-step method the acid and amine components, which go to form the polyamide segment, are polymerized in the presence of the crystalline polyester prepolymer. In the two step method, the polyamide and polyester prepolymer segments are prepared separately and then reacted together to form the poly(ester-amide). These methods are discussed in greater detail in the working examples set forth below.

The vinyl aromatic polymers used in the adhesive blends of the invention are prepared by conventional procedures from the corresponding monomers and contain at least 50 weight percent of polymer units derived from at least one monomer having the formula:

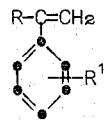

wherein R is hydrogen or an alkyl group containing 1 to 4 carbon atoms and $R^1$ is hydrogen or at least one member selected from the group consisting of chlorine, alkyl groups containing 1 to 4 carbon atoms, and phenyl.

The vinyl aromatic polymer may be a copolymer, block polymer, graft polymer, or blend containing up to 50 weight percent of polymer units derived from one or more of the following: olefins containing up to 12 carbon atoms (e.g., ethylene, propylene, butene, 4-methylpentene), butadiene, vinylnaphthalene, divinylbenzene, alkyl esters of acrylic and methacrylic acids wherein the alkyl groups contain from 1 to 4 carbons, acrylonitrile, methacrylonitrile, maleic anhydride, vinyl acetate, and ohter polymerizable compounds containing a —CH=C< group and which give copolymers which are stable under the extrusion and bonding conditions. Polystyrene is the preferred vinyl aromatic polymer. The inherent viscosity of the vinyl aromatic polymers used in the blends of the invention may vary from about 0.1 to 0.8 or more, but the preferred inherent viscosity is about 0.5 to 0.8.

The polyester prepolymer of this invention is prepared by conventional techniques, for example, by ester interchange of the selected glycol with the dimethyl ester of terephthalic acid.

Blending of the poly(ester-amides) with the vinyl polymers may be carried out by various common procedures, including mechanical mixing of the particles, blending on hot rolls, mixing in the melt, or mixing in solution and then removing the solvent. A satisfactory procedure is to stir the two polymers together under an inert atmosphere in a flask immersed in a metal bath. A preferred method is to blend the polymer in powder or granular form and extrude with a screw-type extruder.

Substances which may be laminated by the adhesives of this invention include metals (such as steel, iron, aluminum, chromium, copper, brass, bronze, nickel, zinc, titanium, and tin), wood, glass, ceramic materials, paper, cardboard, and fabrics. Substrates coated with a synthetic resin such as polyepoxide resin, epoxyphenolic resin, melamine resin, phenolic resin, alkyd resin, a vinyl, or an acrylic coating also may be laminated with the blends of this invention. The same or different materials may be laminated in one structure. It is generally advisable to clean the surfaces of the components to be laminated just prior to formation of the melt adhesive bonds to remove foreign matter grease, oxide coatings, etc., which might interfere with the formation of strong bonds.

The adhesive may be applied in molten form with a spatula or regular extrusion equipment to the surfaces of the components to be laminated. Alternatively, a film of the polyester (2 to 6 mils in thickness) may be placed between the surfaces. After application of the polyester, the surfaces are clamped together with a pressure of several pounds per square inch and heat is applied by placing the clamped structure in a forced-air oven about 20° to 50°C. above the softening range of the adhesive. A convenient way of bonding metal test strips for peel tests is to heat them together on a hot plate while rubbing back and forth with a wooden spatula. No additional pressure is necessary. A glue line (adhesive thickness) of 3 to 5 mils is satisfactory.

Fillers, pigments, processing aids, and glass cloth may be incorporated in the adhesive layer to increase the bonding strength and temperature resistance. Fillers and pigments, such as very finely divided silica, alumina, or calcium carbonate, also affect the degree of crystallinity and the size of the crystallites. From 1 to 30% by weight may be added. Additives or processing aids may be used to further decrease the melt viscosity of the blends for more ease of application. Such processing aids are disclosed in U.S. Pat. No. 3,644,267, and terphenyl is preferred. Antioxidants and stabilizers also may be incorporated in the polymers to improve the thermal and oxidative stability at elevated temperatures.

The examples which follow are submitted for a better understanding of the invention.

Parts and percentages are by weight and temperatures are in degrees Centigrade unless otherwise specified. All inherent viscosities are determined at 25°C. using 0.50 gram of polymer per 100 ml. of a solvent consisting of 60 percent by weight phenol and 40 percent by weight tetrachloroethane.

In the examples, all poly(ester-amides) are prepared by the following procedure:

The amorphous polyamide segment of the block poly(ester-amide) is first prepared by heating and stirring the diamine(s), the dimer acid, and in some cases, a second aliphatic dicarboxylic acid at 190°–220°C. for about 1 hour at 100–150 psi. The reaction vessel is then vented, and the calculated amount of crystalline polyester segment (I.V. 0.1–0.5) is added. The reaction vessel is then heated slowly to 260°–280°C. over a period of an hour under nitrogen at 40–60 psi. and maintained under these conditions for about 30 minutes. The reaction vessel is then vented and vacuum is applied. The reaction is continued under full vacuum (0.2 to 5 mm. of Hg) for 2–4 hours. The molten poly(esteramide) is then discharged under pressure into water and quenched. The inherent viscosity of the amber polymers obtained is about 0.4–0.8.

The poly(ester-amide)/vinyl aromatic polymer blends are prepared by mixing 2 to 3-mm. particles of the two polymers and melt extruding them at 200°–240°C. into a small rod. The rod is then chopped into ⅛-inch pellets which are used to prepare the adhesive bonds. The vinyl aromatic polymer used in the adhesive blends of Tables 1, 2, and 3 is polystyrene having an I.V. of 0.72.

The T-peel strengths are determined on 6-mil, tin-free steel (TF-steel) in accordance with ASTM D1876 but using precut (1-inch wide) specimens. The metal specimens are first degreased by washing three times in a detergent solution of Alconox (Alconox, Inc.) and rinsing in water each time. The metal specimens are then rinsed in acetone and allowed to air dry.

To prepare an adhesive bond, a specimen is heated sufficiently on a hot plate for the blend to melt (applied as 20-mesh to ⅛-inch particles or by rubbing a large piece back and forth). A hot plate temperature of 280°C. is used. After the molten polymer is evenly spread on the specimen over a 2-inch length with a wooden spatula, the top piece of metal is pressed against the sample. The sample is then turned over on the hot plate with the second metal strip against the hot plate surface. Heating is continued while the wooden spatula is rubbed back and forth over the adhesive area until a smooth, even glue line is obtained (about 20 seconds). Then the specimen is placed on the laboratory bench and rubbing continued about 10 seconds longer while the adhesive cools. This method of forming the adhesive bonds gives reproducible results similar to those obtained by clamping the specimens together and heating in a forced-air oven 20°–50°C. above the polymer melting point. Glue lines are about 3 to 5 mils in thickness.

All bond aging tests are carried out in a forced-air, convectionheated oven at 100°C. ±1°C. for 24 hours. The specimens are allowed to cool to room temperature (25°C.) before testing.

The polyamide block of the block poly(ester-amides) used in the examples of Table 1 is derived from dimer acid and hexamethylene diamine. This table illustrates the effect of polystyrene content on the bond aging characteristics of poly(ester-amide)/polystyrene blends.

TABLE 1

| Example | Poly(ester-amide) Polyester Segment Composition | Wt.% | Final I.V. | Polystyrene Content, Wt. % | T-Peel, Lb./In. Width, on Steel at 23°C. After Aging | |
|---|---|---|---|---|---|---|
| | | | | | Unaged | 1 Day at 100°C. |
| 1 (Control) | Poly(ethylene terephthalate) | 50 | 0.60 | 0 | 28 | 16 |
| 2 | Poly(ethylene terephthalate) | 50 | 0.60 | 5 | 27 | 19 |
| 3 | Poly(ethylene terephthalate) | 50 | 0.60 | 10 | 26 | 21 |
| 4 | Poly(ethylene terephthalate) | 50 | 0.60 | 20 | 27 | 28 |
| 5 | Poly(ethylene terephthalate) | 50 | 0.60 | 40 | 21 | 17 |
| 6 (Control) | Poly(ethylene terephthalate) | 60 | 0.65 | 0 | 24 | 4 |
| 7 | Poly(ethylene terephthalate) | 60 | 0.65 | 5 | 30 | 7 |
| 8 | Poly(ethylene terephthalate) | 60 | 0.65 | 10 | 37 | 11 |
| 9 | Poly(ethylene terephthalate) | 60 | 0.65 | 20 | 30 | 16 |
| 10 | Poly(ethylene terephthalate) | 60 | 0.65 | 40 | 23 | 15 |
| 11 (Control) | Poly(ethylene terephthalate) | 70 | 0.67 | 0 | 4 | 2 |
| 12 | Poly(ethylene terephthalate) | 70 | 0.67 | 5 | 24 | 6 |
| 13 | Poly(ethylene terephthalate) | 70 | 0.67 | 10 | 27 | 6 |
| 14 | Poly(ethylene terephthalate) | 70 | 0.67 | 20 | 29 | 9 |
| 15 | Poly(ethylene terephthalate) | 70 | 0.67 | 40 | 18 | 9 |

TABLE 1-continued

| Example | Poly(ester-amide) Polyester Segment Composition | Wt.% | Final I.V. | Polystyrene Content, Wt. % | T-Peel, Lb./In. Width, on Steel at 23°C. After Aging | |
|---|---|---|---|---|---|---|
| | | | | | Unaged | 1 Day at 100°C. |
| 16 (Control) | Poly(ethylene terephthalate) | 80 | 0.65 | 0 | 5 | 3 |
| 17 | Poly(ethylene terephthalate) | 80 | 0.65 | 5 | 19 | 5 |
| 18 | Poly(ethylene terephthalate) | 80 | 0.65 | 10 | 25 | 6 |
| 19 | Poly(ethylene terephthalate) | 80 | 0.65 | 20 | 30 | 11 |
| 20 | Poly(ethylene terephthalate) | 80 | 0.65 | 40 | 12 | 5 |
| 21 (Control) | Poly(ethylene terephthalate) | 95 | 0.66 | 0 | 2 | 1 |
| 22 | Poly(ethylene terephthalate) | 95 | 0.66 | 5 | 13 | 10 |
| 23 | Poly(ethylene terephthalate) | 95 | 0.66 | 20 | 18 | 12 |
| 24 (Control) | Poly(tetramethylene terephthalate) | 50 | 0.63 | 0 | 1 | 1 |
| 25 | Poly(tetramethylene terephthalate) | 50 | 0.63 | 5 | 12 | 12 |
| 26 | Poly(tetramethylene terephthalate) | 50 | 0.63 | 10 | 15 | 10 |
| 27 | Poly(tetramethylene terephthalate) | 50 | 0.63 | 20 | 13 | 7 |
| 28 | Poly(tetramethylene terephthalate) | 50 | 0.63 | 40 | 3 | 2 |
| 29 (Control) | Poly(tetramethylene 80/20 terephthalate/iso-phthalate) | 60 | 0.68 | 0 | 5 | 3 |
| 30 | Poly(tetramethylene 80/20 terephthalate/iso-phthalate) | 60 | 0.68 | 5 | 12 | 8 |
| 31 | Poly(tetramethylene 80/20 terephthalate/iso-phthalate) | 60 | 0.68 | 10 | 16 | 10 |
| 32 | Poly(tetramethylene 80/20 terephthalate/iso-phthalate) | 60 | 0.68 | 20 | 15 | 11 |
| 33 | Poly(tetramethylene 80/20 terephthalate/iso-phthalate) | 60 | 0.68 | 40 | 10 | 7 |
| 34 (Control) | Copoly(80/20 tetra-methylene/ethylene terephthalate) | 60 | 0.64 | 0 | 5 | 2 |
| 35 | Copoly(80/20 tetra-methylene/ethylene terephthalate) | 60 | 0.64 | 5 | 15 | 6 |
| 36 | Copoly(80/20 tetra-methylene/ethylene terephthalate) | 60 | 0.64 | 10 | 18 | 8 |
| 37 | Copoly(80/20 tetra-methylene/ethylene terephthalate) | 60 | 0.64 | 20 | 21 | 12 |
| 38 | Copoly(80/20 tetra-methylene/ethylene terephthalate) | 60 | 0.64 | 40 | 16 | 7 |
| 39 (Control) | Poly(hexamethylene terephthalate) | 60 | 0.72 | 0 | 2 | 1 |
| 40 | Poly(hexamethylene terephthalate) | 60 | 0.72 | 5 | 15 | 10 |
| 41 | Poly(hexamethylene terephthalate) | 60 | 0.72 | 10 | 18 | 12 |
| 42 | Poly(hexamethylene terephthalate) | 60 | 0.72 | 20 | 17 | 10 |
| 43 | Poly(hexamethylene terephthalate) | 60 | 0.72 | 40 | 5 | 4 |

The examples of Table 1 illustrate the improved T-peel strengths which are obtained in all cases after accelerated bond aging of the poly(ester-amide)/polystyrene blends of the invvention, when compared to the T-peel strengths of the respective poly(ester-amides) alone. These examples also illustrate that, in most cases, the T-peel strengths even before bond aging of the block poly(ester-amides) on the steel substrate are significantly improved by the addition of only a very small amount of polystyrene.

Examples 44–48 of Table 2 which follows illustrate the improved bond aging characteristics which are obtained when polystyrene is blended with a block poly(ester-amide) which is comprised of 60 weight percent of polyester blocks of poly(ethylene terephthalate) and 40 weight percent of polyamide blocks derived from dimer acid and ethylene diamine, instead of hexamethylene diamine. The I.V. of the block poly(ester-amide) is 0.64.

TABLE 2

| Example | Polystyrene Content, % | T-Peel, Lb./In. Width, on Steel at 23°C. After Bond Aging | |
|---|---|---|---|
| | | Unaged | 1 Day at 100°C. |
| 44 (Control) | 0 | 16 | 3 |
| 45 | 5 | 19 | 7 |
| 46 | 10 | 23 | 12 |
| 47 | 20 | 20 | 13 |
| 48 | 40 | 15 | 8 |

Examples 49–53 of Table 3 which follows illustrate the improved bond aging characteristics which are obtained when polystyrene is blended with a block poly(ester-amide) which is composed of 60 weight percent of polyester blocks of poly(ethylene terephthalate) and 40 weight percent of copolyamide blocks derived from hexamethylene diamine and a 75/25 weight ratio of dimer/sebacic acids. The I.V. of the block poly(esteramide) is 0.69.

TABLE 3

| Example | Polystyrene Content, % | T-Peel, Lb./In. Width, on Steel at 23°C. After Bond Aging | |
|---|---|---|---|
| | | Unaged | 1 Day at 100°C. |
| 49 (Control) | 0 | 20 | 4 |
| 50 | 5 | 24 | 7 |
| 51 | 10 | 27 | 14 |
| 52 | 20 | 25 | 13 |
| 53 | 40 | 26 | 10 |

Examples 54 through 63 of Table 4 which follows illustrate the effects on the T-peel strength at 23°C. before and after bond aging for 1 day at 100°C. on tin-free steel (TF-steel) of (a) the I.V. of the polystyrene, including copolymers, and (b) the composition of the polystyrene copolymer. The block poly(ester-amide) used in the blends of these examples contains 60 weight percent of poly(ethylene terephthalate) segments and 40 weight percent of segments of the amorphous polyamide of dimer acid and hexamethylene diamine. The I.V. of the block poly(esteramide) is 0.65.

TABLE 4

| Example | Polystyrene Polymer or Copolymer Comonomer | I.V. | Amt. Wt. % | T-Peel on Steel at 23°C., Lb./In. Width | |
|---|---|---|---|---|---|
| | | | | Unaged | Aged 1 Day at 100°C. |
| 54 (Control | — | — | 0 | 24 | 4 |
| 55 | None | 0.10 | 20 | 28 | 12 |
| 56 | None | 0.28 | 20 | 30 | 15 |
| 57 | None | 0.58 | 20 | 32 | 13 |
| 58 | None | 0.72 | 20 | 30 | 16 |
| 59 | 10 wt. % Acrylonitrile | 0.65 | 20 | 29 | 10 |
| 60 | 12 wt. % α-Methylstyrene | 0.56 | 20 | 30 | 13 |
| 61 | 20 wt. % Butadiene | 0.81 | 20 | 26 | 12 |
| 62 | 5 wt. % Methyl acrylate | 0.52 | 20 | 24 | 9 |
| 63 | 15 wt. % Vinyl acetate | 0.73 | 20 | 22 | 8 |

The term "acid" is used broadly herein and is intended to include ester-forming derivatives thereof. For example, "terephthalic acid" includes ester-forming derivatives thereof such as dimethyl terephthalate.

Although the invention has been described in considerable detail with particular reference to certain preferred embodiments thereof, variations and modifications may be effected within the spirit and scope of the invention.

We claim:

1. An adhesive composition comprising
   a. from about 95 to about 60 percent by weight of a poly(esteramide) block copolymer having from about 45 to about 95 percent by weight of crystalline polyester segments derived from at least one aliphatic or alicyclic glycol having from 2 to 10 carbon atoms and at least one dicarboxylic acid having from 2 to 20 carbon atoms, and from about 55 to about 5 percent by weight of amorphous polyamide segments derived from a dimer acid and an aliphatic primary diamine containing 2 to 10 carbon atoms, and
   b. from about 5 to about 40 percent by weight of a vinyl aromatic polymer of which at least 50 percent by weight of its polymeric units are derived from at least one monomer having the formula

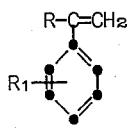

wherein R is hydrogen or an alkyl group containing 1 to 4 carbon atoms and $R_1$ is hydrogen, chlorine, phenyl or an alkyl group containing 1 to 4 carbon atoms.

2. An adhesive composition according to claim 1 wherein said vinyl aromatic polymer is polystyrene.

3. An adhesive composition according to claim 1 wherein said dicarboxylic acid is at least 80 percent terephthalic acid.

4. An adhesive composition according to claim 1 wherein said diamine is 1,6-hexanediamine.

5. An adhesive composition according to claim 1 wherein said poly(ester-amide) has from about 50 to about 80 percent by weight crystalline polyester segments and from about 50 to about 20 percent by weight amorphous polyamide segments.

6. An adhesive composition according to claim 1 comprising about 95 to about 75 percent poly(ester-amide) and about 5 to about 25 percent vinyl aromatic polymer.

7. An adhesive composition comprising
   a. from about 75 to about 95 percent by weight of a poly(esteramide) having from about 50 to about 80 percent by weight of crystalline polyester segments derived from at least one aliphatic or alicyclic glycol having from 2 to 6 carbon atoms and at least one dicarboxylic acid, at least 80 percent of which is terephthalic, and from about 50 to about 20 percent by weight of amorphous polyamide segments derived from a dimer acid and 1,6-hexanediamine, b. from about 25 to about 5 percent by weight of a vinyl aromatic polymer of which at least 50 percent by weight of its polymeric units are derived from at least one monomer having the formula

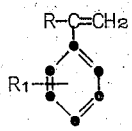

wherein R is hydrogen or an alkyl group containing 1 to 4 carbon atoms and $R_1$ is hydrogen, chlorine, phenyl or an alkyl group containing 1 to 4 carbon atoms.

8. An adhesive composition according to claim 7 wherein said vinyl aromatic polymer is polystyrene.

9. An article of manufacture comprising a pair of substrates bonded together with a composition comprising
   a. from about 95 to about 60 percent by weight of a poly(ester-amide) block copolymer having from about 45 to about 95 percent by weight of crystalline polyester segments derived from at least one aliphatic or alicyclic glycol having from 2 to 10 carbon atoms and at least one dicarboxylic acid having from 2 to 20 carbon atoms, and from about 55 to about 5 percent by weight of amorphous polyamide segments derived from a dimer acid and an aliphatic primary diamine containing 2 to 10 carbon atoms, and
   b. from about 5 to about 40 percent by weight of a vinyl aromatic polymer of which at least 50 percent by weight of its polymeric units are derived from at least one monomer having the formula

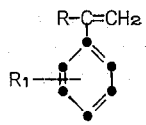

wherein R is hydrogen or an alkyl group containing 1 to 4 carbon atoms and $R_1$ is hydrogen, chlorine, phenyl or an alkyl group containing 1 to 4 carbon atoms.

10. An article of manufacture according to claim 9 wherein said vinyl aromatic polymer is polystyrene.

11. An article of manufacture according to claim 9 wherein said dicarboxylic acid is at least 80 percent terephthalic acid.

12. An article of manufacture according to claim 9 wherein said diamine is 1,6-hexanediamine.

13. An article of manufacture according to claim 9 wherein said poly(ester-amide) has from about 50 to about 80 percent by weight crystalline polyester segments and from about 50 to about 20 percent by weight amorphous polyamide segments.

14. An article of manufacture according to claim 9 wherein said composition comprises about 95 to about 75 percent poly(ester-amide) and about 5 to 25 percent vinyl aromatic polymer.

15. An article of manufacture comprising a pair of substrates bonded together with a composition comprising
   a. from about 75 to about 95 percent by weight of a poly(ester-amide) having from about 50 to about 80 percent by weight of crystalline polyester segments derived from at least one aliphatic or alicyclic glycol having from 2 to 6 carbon atoms and at least one dicarboxylic acid, at least 80 percent of which is terephthalic, and from about 50 to about 20 percent by weight of amorphous polyamide segments derived from a dimer acid and 1,6-hexanediamine,
   b. from about 25 to about 5 percent by weight of a vinyl aromatic polymer of which at least 50 percent by weight of its polymeric units are derived from at least one monomer having the formula

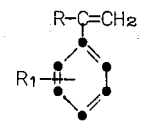

wherein R is hydrogen or an alkyl group containing 1 to 4 carbon atoms and $R_1$ is hydrogen, chlorine, phenyl or an alkyl group containing 1 to 4 carbon atoms.

16. An article according to claim 15 wherein said vinyl aromatic polymer is polystyrene.

17. The method of bonding a pair of substrates together comprising applying evenly to at least one of said substrates the molten composition of claim 1, pressing the substrates together with adhesive in the middle, and allowing said substrates to cool.

18. The method of bonding a pair of substrates together comprising applying evenly to at least one of said substrates the molten composition of claim 15, pressing the substrates together with adhesive in the middle and allowing said substrates to cool.

* * * * *